United States Patent
Mobin et al.

(10) Patent No.: US 8,605,847 B2
(45) Date of Patent: Dec. 10, 2013

(54) RECEIVER TRAINING WITH CYCLE SLIP DETECTION AND CORRECTION

(75) Inventors: Mohammad Mobin, Orefield, PA (US); Mark Trafford, Fleetwood, PA (US); Ye Liu, San Jose, CA (US); Vladimir Sindalovsky, Perkasie, PA (US); Amaresh Malipatil, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 322 days.

(21) Appl. No.: 13/043,908

(22) Filed: Mar. 9, 2011

(65) Prior Publication Data

US 2012/0230454 A1 Sep. 13, 2012

(51) Int. Cl.
*H04L 7/00* (2006.01)

(52) U.S. Cl.
USPC ........... 375/355; 375/229; 375/232; 375/233; 375/316; 375/354; 375/358; 375/371; 375/373; 375/376; 455/260; 455/502; 455/516; 370/503; 370/508; 370/509; 370/510; 370/511; 370/512; 370/513; 370/514; 370/516; 327/141; 327/147; 327/156; 327/163; 333/18; 333/28 R

(58) Field of Classification Search
USPC ......... 375/229, 232, 233, 316, 354, 355, 358, 375/371, 373, 376; 455/260, 502, 516; 370/503, 508–514, 516; 327/141, 147, 327/156, 163; 333/18, 28 R
See application file for complete search history.

(56) References Cited

U.S. PATENT DOCUMENTS

| | | | |
|---|---|---|---|
| 2009/0168936 A1* | 7/2009 | Mobin et al. | 375/357 |
| 2010/0329325 A1* | 12/2010 | Mobin et al. | 375/232 |
| 2012/0170621 A1* | 7/2012 | Tracy et al. | 375/219 |

* cited by examiner

*Primary Examiner* — Leon Flores

(57) ABSTRACT

In described embodiments, a transceiver includes a clock and data recovery module (CDR) with an eye monitor and a cycle slip monitor. The cycle slip detector monitors a CDR lock condition, which might be through detection of slips in sampling and/or transition timing detection. The cycle slip detector provides a check point to sense system divergence, allowing for a mechanism to recover CDR lock. In addition, when the CDR is out-of-lock, the various parameters that are adaptively set (e.g., equalizer parameters) might be invalid during system divergence. Consequently, these parameters might be declared invalid by the system and not used.

20 Claims, 7 Drawing Sheets

400

500

FIG. 8
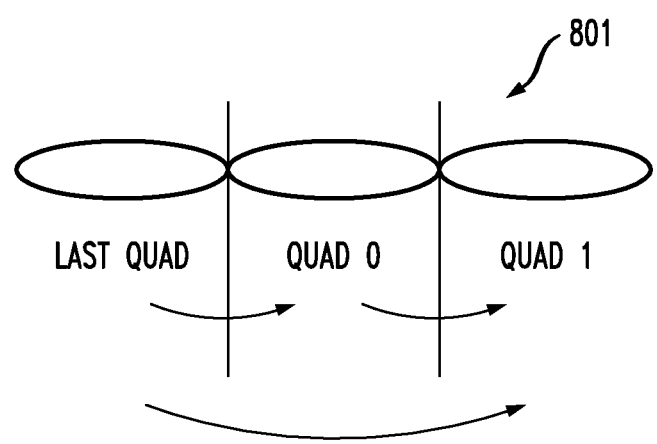
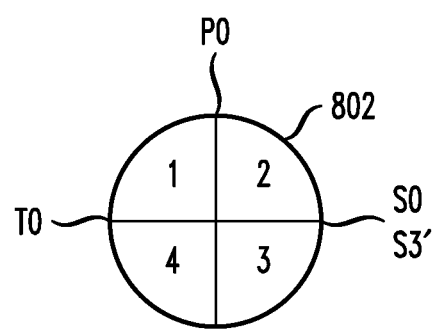

RECEIVER TRAINING WITH CYCLE SLIP DETECTION AND CORRECTION

BACKGROUND OF THE INVENTION

1. Field of the Invention

The present invention relates to communication transceiver clock and data recovery, and, in particular, to detecting and correcting for cycle slip of data sampling.

2. Description of the Related Art

In many data communication applications, Serializer and De-serializer (SerDes) devices facilitate the transmission between two points of parallel data across a serial link. Data at one point is converted from parallel data to serial data and transmitted through a communications channel to the second point where it received and converted from serial data to parallel data.

At high data rates, frequency-dependent signal loss from the communications channel (e.g., the signal path between the two end points of a serial link) as well as signal dispersion and distortion can occur. As such, the communications channel, whether wired, optical, or wireless, acts as a filter and might be modeled in the frequency domain with a transfer function. Correction for frequency dependent losses of the communications channel, and other forms of signal degradation, often requires signal equalization at a receiver of the signal. Equalization through use of one or more equalizers compensates for the signal degradation to improve communication quality. Equalization may also be employed at the transmit side to pre-condition the signal. Equalization, a form of filtering, generally requires some estimate of the transfer function of the channel to set its filter parameters. However, in many cases, the specific frequency-dependent signal degradation characteristics of a communications channel are unknown, and often vary with time. In such cases, an equalizer with adaptive setting of parameters providing sufficient adjustable range might be employed to mitigate the signal degradation of the signal transmitted through the communications channel. An automatic adaptation process is often employed to adjust the equalizer's response. Equalization might be through a front end equalizer, a feedback equalizer, or some combination of both.

FIG. 1 shows a data eye diagram 100 overlaid with exemplary data sampler (DS) 102. Data eye diagram 100 illustrates super-positions of many data eyes of signal transitions expressed in amplitude versus time (in unit interval, or "UI", corresponding to a symbol period). The data eye is created as signals transition from low to low, low to high, high to low and high to high. The data sampler, along with top, center and/or bottom transition samplers (illustrated as a single, center transition sampler (TS) 103 in FIG. 1) are placed in the data stream to capture the frequency and phase of the data transitions, and this timing is then used by a clock and data recovery circuit to set correct frequency and phase of a sampling clock. Further, error samplers, shown in FIG. 1 as top and bottom error samplers ES 104 and 105, respectively, are placed in the data eye to generate error samples to detect timing and/or amplitude error for use by adaptation and tracking algorithms. As employed herein, "placing" a sampler (latch) in a data stream requires setting a voltage threshold and clocking phase of the sampler to detect a predetermined point in the data eye. Clocking the data sampler with a clock signal with known frequency and phase derived with respect to the detected symbol transitions of data allows for clock recovery of symbols within the data stream generating the eye. Thus, "placing" a data sampler in the signal path with a threshold and sampling clock equivalent to the amplitude and timing at the center of the eye corresponds to correct sampling to make a decision as to the value of a received data symbol.

Ideally, without noise, jitter, and other loss and dispersion effects, the data eye will exhibit a relatively ideal shape, illustrated as ideal eye 110. In practice, as described previously, the shape of the data eye changes, illustrated as actual eye 111, with noise, jitter, ISI, other loss and dispersion effects, and temperature and voltage variations. The shape of the data eye also changes due to equalization applied to input signal of the receiver. In some systems, equalization is also applied by a transmitter's equalizer, further altering the shape of the eye from the ideal. After equalization, the inner eye of the transceiver is open, with some margin for supporting channels. If a simple, analog front-end equalizer (AFE) is employed, the data eye operating margin improves. However, better performance might be achieved through use of a Decision Feedback Equalizer (DFE) in combination with an AFE. Classical DFE equalization optimizes for ISI and opens up the vertical and horizontal data eye opening.

Initially, however, the high speed SerDes receiver brings up the receiver by first achieving clock recovery with a clock and data recovery circuit (CDR) in presence of a relatively closed data eye. Later, data recovery integrity is achieved through proper equalization with respect to a specified bit error rate (BER) target threshold. The data recovery integrity is achieved through a process of gain adaptation as well as transmitter tap equalization along with receiver equalization. Receiver equalization is further divided into two separate equalization adaptation operations, such as for the analog equalizer equalization and the decision feedback equalization. While these equalization processes are taking place, the signal integrity might be severely degraded due to direct signal distortion as well as sampling skew variation. This dynamic behavior might cause the CDR to diverge, causing errors in the adaptation process and possibly a system start-up failure. Typically, occasional divergence requires start-up recovery that is performed by a link layer of the receiver by i) operating the SerDes receiver at a reduced speed or ii) multiple retries, both of which techniques might cause system boot-up delays.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment of the present invention, a clock and data recovery module (CDR) generates a local clock and includes an eye monitor and a cycle slip monitor. The eye monitor generates a data eye from a data stream subject to equalization, the eye monitor including a transition sampler, an intermediate sampler and a data sampler, each sampler having timing derived from the local clock; and the cycle slip detector detects a CDR out-of-lock condition based on outputs of the transition, intermediate, and data samplers with respect to signal transitions between quadrants. An adaptation module adaptively sets parameters of one or more corresponding devices to the data stream based upon the local clock of the CDR module, and adaptation of the parameters of at least one of the devices is suspended based on detection of the CDR out-of-lock condition.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 8 shows a signal walking from quadrant to quadrant for the example of FIG. 6.

DETAILED DESCRIPTION

In accordance with embodiments of the present invention, a transceiver includes a clock and data recovery module (CDR) with an eye monitor and a cycle slip detector. The cycle slip detector monitors a CDR lock condition, which might be through detection of slips in sampling and/or transition timing detection. The cycle slip detector provides a check point to sense system divergence, allowing for a mechanism to recover CDR lock during, for example, the initialization and start-up process. In addition, when the CDR is out of lock, the various parameters that are adaptively set (e.g., equalizer parameters) might be invalid during system divergence. Consequently, these parameters might be declared invalid by the system and not used when loss of CDR lock is detected.

Figure 1:
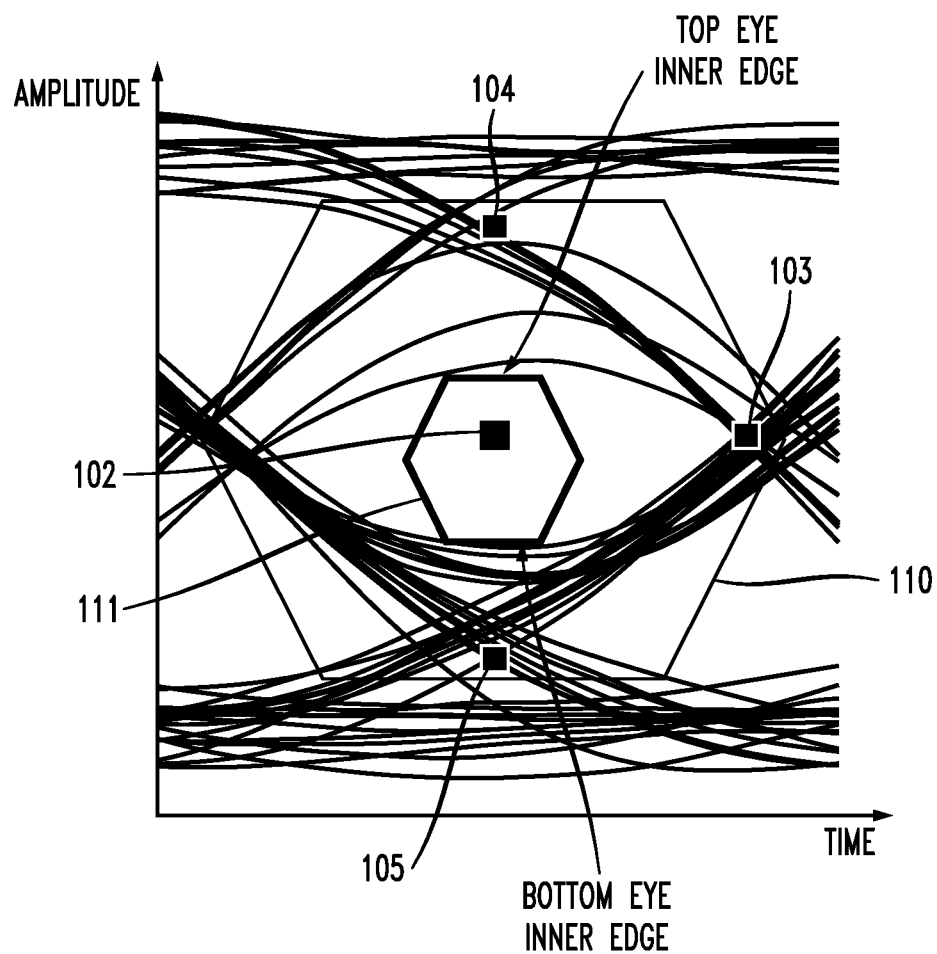
FIG. 1 shows an exemplary data eye diagram of prior art systems.
Figure 2:
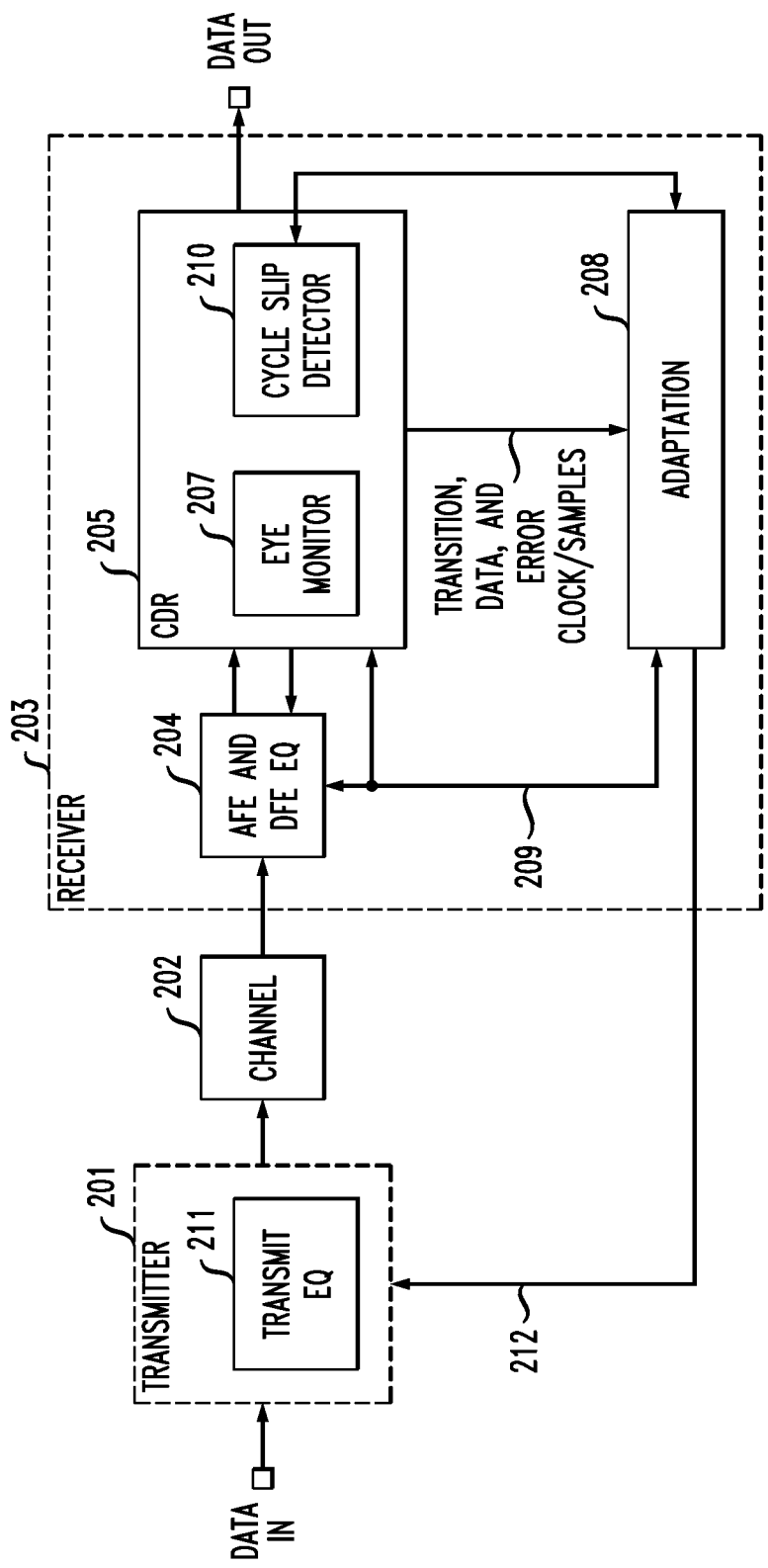
FIG. 2 shows a block diagram of communication system operating in accordance with exemplary embodiments of the present invention.

FIG. 2 shows a block diagram of communication system 200 (such as a SerDes system) with a receiver operating in accordance with exemplary embodiments of the present invention. System 200 includes transmitter 201 that transmits a signal through communication channel 202. Channel 202, which might be wired, wireless, optical or some other medium, has an associated transfer function, loss characteristics, and/or other means for adding impairments to the signal passing through it. System 200 further includes receiver 203 having equalizer (AFE & DFE EQ) 204 to apply equalization to the received signal to correct for frequency losses, inter symbol interference (ISI) or other impairments applied to the signal by channel 202. AFE & DFE EQ 204 might comprise an analog front end (AFE) equalizer followed by a DFE equalizer, but might also include filtering and gain elements. Receiver 203 also includes clock and data recovery unit (CDR) 205 having real-time data eye monitor 207 and cycle slip detector 210. AFE & DFE EQ 204 is coupled to adaptation module 208 through link 209. Adaptation module 208 receives the equalized data stream (either from an AFE equalizer, a DFE equalizer, or both) and exchanges information of equalizer and gain parameters to generate parameters to adaptively set gain and equalization of receiver 203. CDR 205 is coupled to adaptation module 208 to provide transition sample, data sample, and error sample information (clock signals and sample values discussed subsequently), as well as data decisions and other information employed by adaptation module 208 for the adaptation process from initial lock on the input data signal by CDR 205, to adaptation convergence, to steady state operation.

Also shown in FIG. 2 is back-channel link 212 that might allow for communication between adaptation module 208 of receiver 203 and a transmit equalizer (TX EQ) 211 of transmitter 201. Based on such communication, adaptation module 208 and TX EQ 211 might adaptively set transmit equalizer settings (e.g., tap values), based on the received data stream at receiver 203.

Eye monitor 207 monitors the data eye of the equalized received signal, providing information of eye characteristics based on samplers positioned within the data stream. CDR 205 processes the equalized signal from AFE & DFE EQ 204 to recover timing for locally generated clock signals that sample the equalized signal. Such sampling includes: i) generating transition samples and data samples to recover timing associated with data transitions (e.g., a transition clock) and to generate information (e.g., error samples) for parameter adaptation (e.g., for equalizer and gain adaptation); and ii) recovering timing for data sampling to generate decisions for data symbols. CDR 205 also employs information of eye characteristics from eye monitor 207 to adjust for various clock timing skew of CDR 205. Adaptation module 208 also receives information of eye characteristics from eye monitor 207 to provide local control signals that set various parameters of gain and equalization of receiver 203, and sends signals to TX EQ 211 for adjusting gain and equalization parameters of transmitter 201.

Cycle slip detector 210 monitors a CDR lock condition of CDR 205, which might be through detection of slips in sampling and/or transition timing detection. Cycle slip detector 210 might be termed a rotational frequency detector, or RFD. Slips are caused when the locally generated timing (e.g., through an oscillator) is either faster or slower than the timing of the input data stream. During a CDR lock condition, CDR 205 correctly extracts timing from, and locks sample timing to, the input equalized data signal. Such timing is extracted by sampling of the input signal with, for example, latches and processing the sampled signal. Even though the locally generated clock and the timing of the data stream might vary with respect to each other, in steady state conditions such variation is tracked and accounted for during CDR lock. However, during start-up of the receiver, the data eye as monitored by eye monitor 207 might be severely degraded with little or no amplitude and/or phase margin. Consequently, CDR 205 might lock to and then lose timing of the input signal by not accurately tacking these variations in timing. This loss of timing is loss of the CDR lock condition (or CDR out-of-lock), which occurrence is monitored by cycle slip detector 210 as described subsequently. Upon detection of a loss of the CDR lock condition, cycle slip detector 210 might cause CDR 205 to restart the CDR lock process, and also provides an indication of the lock condition state (valid or invalid) to adaptation module 208. Based upon this indication, adaptation module 208 determines whether adapted gain and equalization tap values are valid. During a loss of CDR lock condition, adaptation module 208 might suspend adaptation updates based on transition, data and error clock/samples, or might switch to an internal algorithm, such as by interpolation, to generate the updated gain and equalization tap values.

Figure 3:
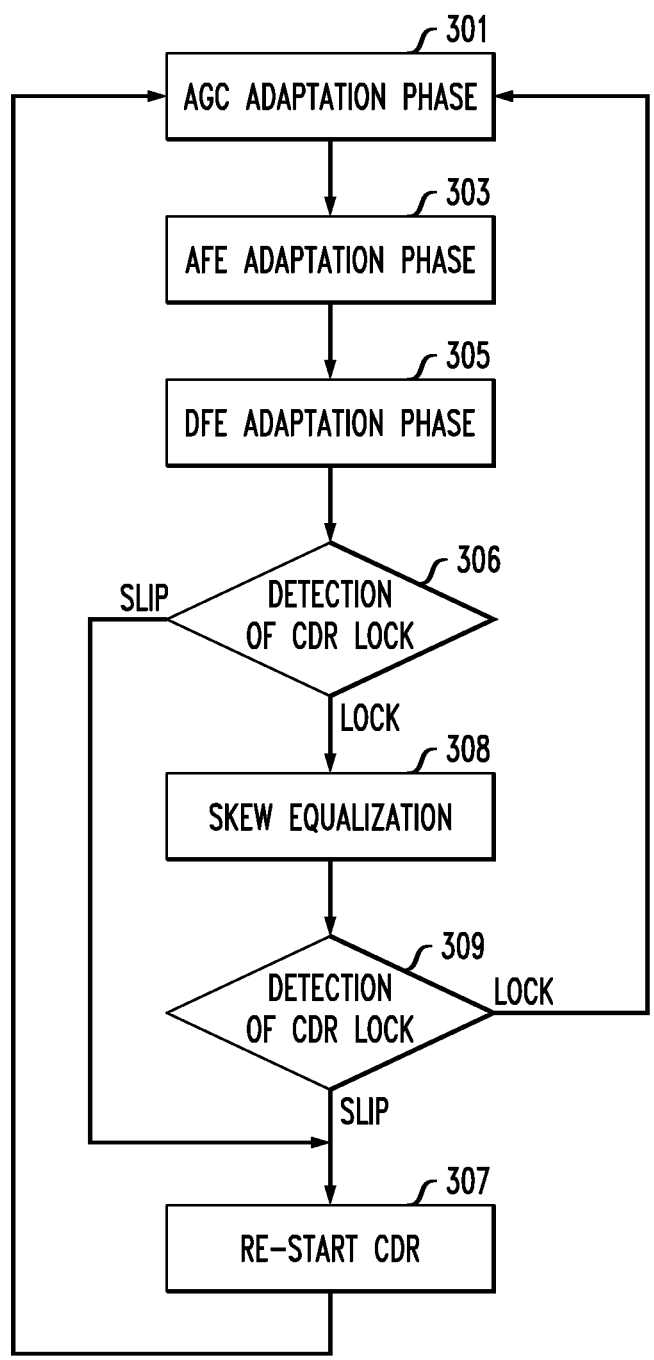
FIG. 3 shows an exemplary method of cycle slip detection and correction based training.

FIG. 3 shows an exemplary method 300 of cycle slip detection and correction based training. At step 301, the adaptation phase of the receiver begins for the automatic gain control (AGC) loop. The AGC adaptation phase generates a set of gain parameters employed for adaptation of gain. At step 303, the adaptation phase of the receiver begins for the analog front-end equalizer (AFE). The AFE adaptation phase generates a set of adaptive equalizer filter parameters. At step 305, the adaptation phase of the receiver begins and generates a set of candidate taps of the decision feedback equalizer (DFE).

Alternatively to steps 301, 303, and 305 of the method of FIG. 3, the adaptation of parameters for AGC, AFE, and DFE (and any other devices or circuits) might be performed concurrently or simultaneously (known as joint adaptation). In such case, joint adaptation might accelerate the acquisition process.

Returning to FIG. 3, once the DFE adaptation phase generates the candidate set of taps in step 305, the current iteration of adaptation for the receiver CDR completes. Consequently, at step 306, a test for detection of CDR lock is performed. If the test of step 306 detects a slip or loss of CDR lock condition, the method advances to step 307 to re-start the CDR and the DFE adaptation phase is set to "invalid". If the test of step 306 detects a CDR lock condition, the DFE adaptation phase is set to "valid", adaptation occurs, and the method advances to step 308. At step 308, sampling skew equalization of the receiver sampling phase adjustment is performed. Again, since the process of skew equalization might cause a loss of CDR lock condition, the test of step 309 checks for detection of a CDR lock condition. If the test of step 309 detects a slip or loss of CDR lock condition (CDR out-of-lock), the method advances to step 307 to re-start the CDR and the skew equalization is set to "invalid". If the test of step 309 detects a CDR lock condition, the skew equalization is set to "valid", adaptation occurs, and the method returns to step 301 to complete the system iteration.

While the AGC, AFE and DFE adaptation phases and skew equalization are shown being performed in sequence in FIG. 3, the present invention is not so limited to the described sequence. Some embodiments might follow each of the AGC, AFE and DFE adaptation phases with a test for detection of CDR lock. In other embodiments, two or more of these operations might be performed in parallel, followed by a test for detection of CDR lock. One skilled in the art might extend or modify the operations of the method for a given design's performance. Further, the method of FIG. 3 might be repeated over several iterations, where the adaptation for a given iteration is stamped as invalid if a loss of CDR lock condition exists. The number of iterations might be programmable, or might be repeated until a set of pre-defined thresholds are met (e.g., BER, SNR, or data eye operating margin).

For exemplary methods such as shown in FIG. 3 using several iterations, for a case of an invalid adaptation operation that is detected, some embodiments might try to readapt for an integer number, N, of tries through a CDR restart mechanism, or alternately skip that invalid phase of adaptation and mark it as "invalid." When all phases are complete, the adaptation parameters are selected corresponding to the maximum observed operating margin and the training process ceases, allowing for normal operation to resume.

Figure 4:
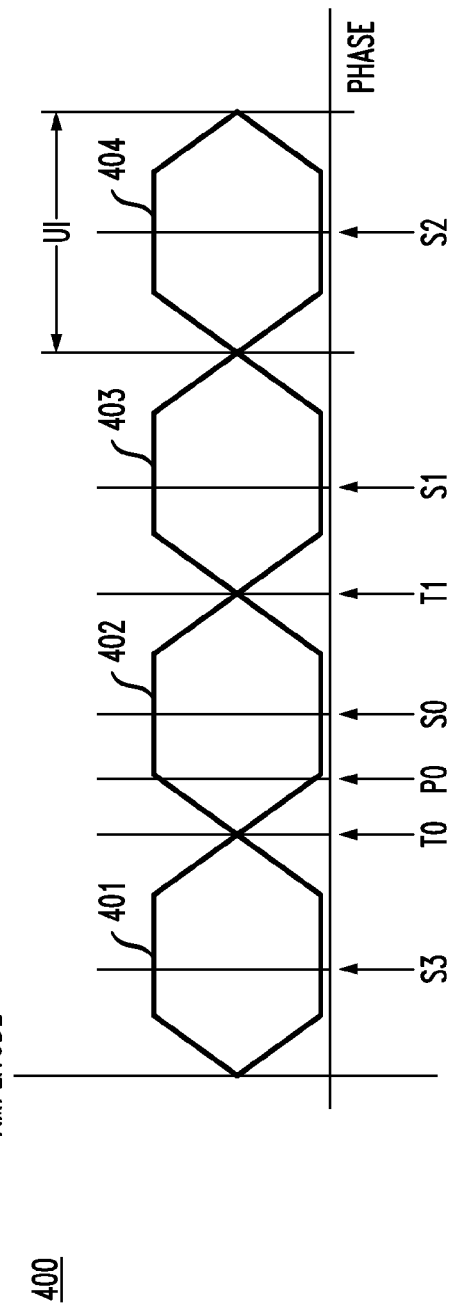
FIG. 4 shows an exemplary sample set of data as might be processed by the cycle slip detector of FIG. 1.
Figure 5:
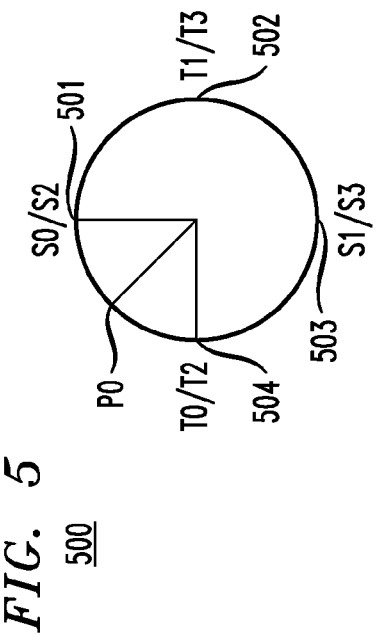
FIG. 5 shows a circle and quadrant representation of the sampling of FIG. 4.

Operation of detector 210 is now described. FIG. 4 shows an exemplary sample set 400 of data, illustrated as data eyes 401-404. Each data eye is defined with corresponding amplitude and phase, and occurs over a single unit interval (UI) of time. A CDR detects timing and generates various sampling clocks. In the exemplary sample set 400, the sampling clocks are denoted as follows: Transition sampling at times T0, T1, T2, and T3; and Data sampling at times S0, S1, S2, and S3. In addition, an intermediate sampling point P0 might also be obtained, such as by interpolating between T0 and S0, which point P0 is placed between the sampling times of T0 and S0 at approximately the center phase. FIG. 5 shows a quadrant representation of the sampling of FIG. 4. As shown in FIG. 5, sampling events occur around a circle in a periodic pattern over two unit intervals, and are represented with S0/S2 occurring at phase 501, T1/T3 occurring at phase 502, S1/S3 occurring at phase 503, and T0/T2 occurring at phase 504. Phases of 501, 502, 503, and 504 are each separated by $\pi/2$ radians, and circle 500 might be divided into four quadrants, Q1, Q2, Q3, and Q4, as described subsequently. Detector 210 monitors the sampling events with relation to each quadrant, and tests the monitored sampling events with respect to an a priori generated truth table, as described below.

Figure 6:
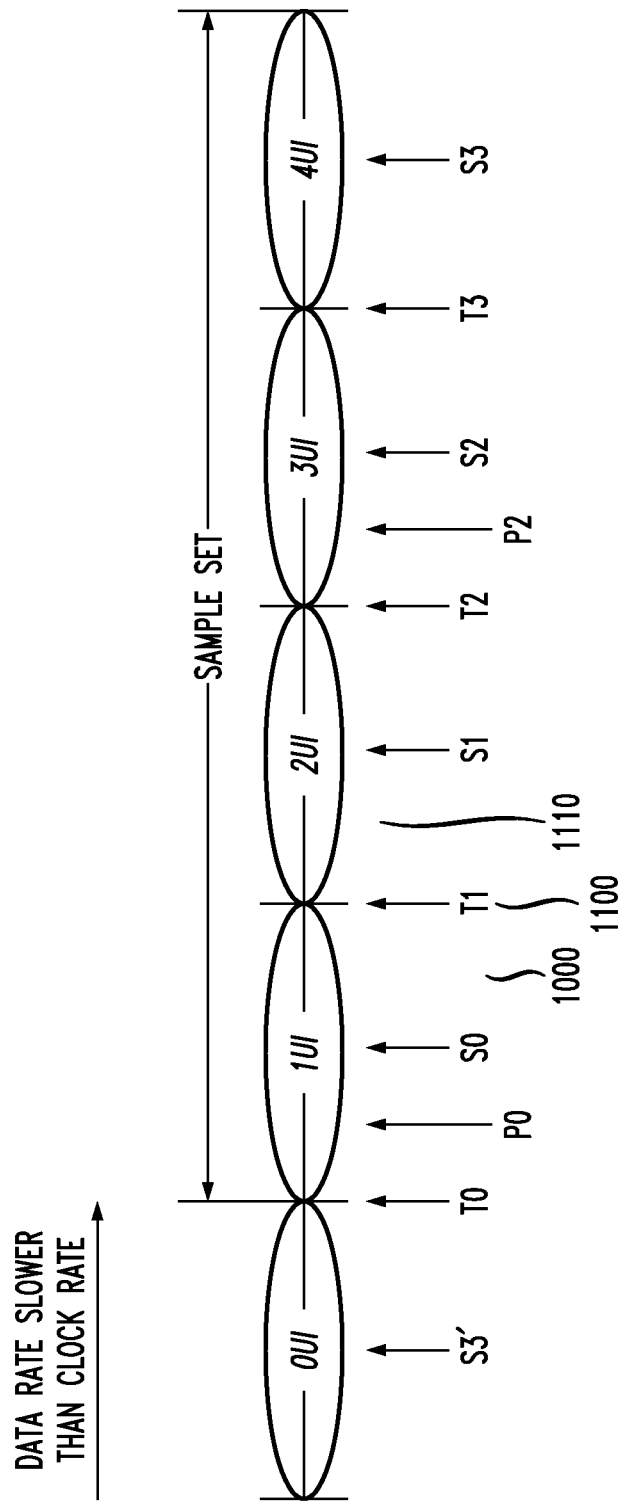
FIG. 6 shows the exemplary sample set of data of FIG. 4 overlaid with data sequences corresponding to cycle slip.

When the CDR is not in lock condition, the data rate may be slower than the locally generated oscillator or faster than the oscillator providing the timing for the sampling clocks. As a result, data and clock timings will "walk" away from each other. As an example, such as that shown overlain on FIG. 4 as illustrated in FIG. 6, when the data rate is slower than the clock rate, data is over-sampled by a latch timed with a locally generated sampling clock. Data samples rotate around the quadrant shown in FIG. 5 in a clockwise direction. For the following, a specific example is described of when data transitions from 1 to 0 (without loss of generality, the example is also true for the case of data transition from 0 to 1 as well as the case when the data rate is faster than the clock rate). In this specific example, the output of sampling latche set [S3, T0, P0, S0] is monitored. Since the local clock is faster than the data timing, the following transition types between quadrants occur in a clock wise direction shown in Table 1 and illustrated in circles 701, 702, and 703 of FIG. 7.

TABLE 1

| S3 | T0 | P0 | S0 | Transition Type |
|---|---|---|---|---|
| 1 | 0 | 0 | 0 | A "1" to "0" Transition between S3 and T0 |
| 1 | 1 | 0 | 0 | A "1" to "0" Transition between T3 and P0 |
| 1 | 1 | 1 | 0 | A "1" to "0" Transition between P0 and S0 |
| ... | ... | ... | ... | ... |
| 1 | 0 | 0 | 0 | A "1" to "0" Transition between S3 and T0 |

Figure 7:
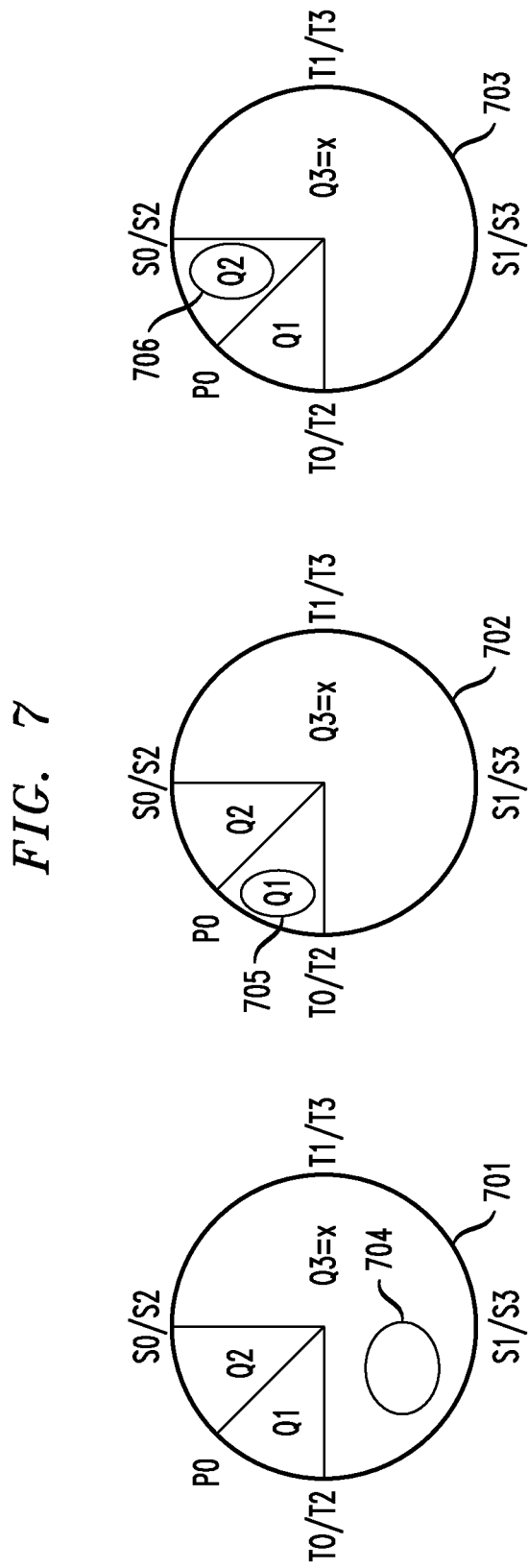
FIG. 7 shows the quadrant representation and transitions for the example of FIG. 6.

For this rotation, Table 1 and FIG. 7 might be generalized to the truth table of Table 2:

TABLE 2

| S3 | T0 | P0 | S0 | Transition Type | Quadrant |
|---|---|---|---|---|---|
| 1 | 0 | 0 | 0 | A "1" to "0" Transition | Q3/4 |
| 0 | 1 | 1 | 1 | A "0" to "1" Transition | Q3/4 |
| 1 | 1 | 0 | 0 | A "1" to "0" Transition | Q1 |
| 0 | 0 | 1 | 1 | A "0" to "1" Transition | Q1 |
| 1 | 1 | 1 | 0 | A "1" to "0" Transition | Q2 |
| 0 | 0 | 0 | 1 | A "0" to "1" Transition | Q2 |

When the CDR timing is locked to the signal, the signal transition will vary between quadrant Q1 and quadrant Q2 about the intermediate sampling point P0. If the CDR is out of lock (e.g., is in large parts-per-million (ppm) variation), as shown in FIG. 8, the signal (801) walks from quadrant to quadrant corresponding to walking around the full circle (802) passing through Quadrants 3 and 4 (also referred to herein as Q3/4).

Detector 210 monitors the sampling events and associated quadrant signal transitions are accumulated over time in an accumulator. Clockwise (CW) quadrant transitions are decoded as "+1" to the accumulator, and counter-clockwise (CCW) quadrant transitions are decoded as "−1". A cycle slip is registered, and slip condition declared, if the accumulator reaches, for example, a +4 or −4. Note that some embodiments might not declare a slip immediately, but might wait to monitor several occurrences of the cycle slip. Thus, a programmable (e.g., 2, 3, 4, 5, etc.) number of cycle slips might cause detector 210 (i.e., the rotational frequency detector) to be set. The gain is programmable, and gear shifted out to a relatively low gain over time.

A transceiver operating in accordance with one or more embodiments of the present invention might provide for the following advantages. The transceiver allows for detection of unsuccessful acquisition, clears out the adaptation history (e.g., parameter values) and then re-initiates the acquisition and adaptation process. The transceiver might exhibit increased performance and effectively accelerate CDR acquisition time by detecting invalid adaptation iterations, or steps, during potential data slip conditions. Consequently, the receiver might be initialized faster, and might be able to re-lock faster, during operation.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the following claims.

We claim:

1. An apparatus for a receiver comprising:
   a clock and data recovery (CDR) module adapted to generate a local clock, the CDR module comprising:
   an eye monitor configured to generate a data eye from a data stream subject to equalization, the eye monitor including a transition sampler, an intermediate sampler and a data sampler, each sampler having timing derived from the local clock; and a cycle slip detector configured to detect a CDR out-of-lock condition based on outputs of the transition, intermediate, and data samplers with respect to signal transitions between quadrants, and an adaptation module configured to adaptively set parameters of one or more corresponding devices to the data stream based upon the local clock of the CDR module, wherein the apparatus suspends adaptation of the parameters of at least one of the devices based on detection of the CDR out-of-lock condition.

2. The apparatus of claim 1, wherein the one or more devices include at least one of an analog front end equalizer (AFE), a decision feedback equalizer (DFE), and a gain circuit.

3. The apparatus of claim 1, wherein the apparatus suspends adaptation during an acquisition period, and the adaptation module is further configured to obtain an adaptation convergence over a number, N, of iterations, where N, is a positive integer.

4. The apparatus of claim 3, wherein the adaptation module checks for the CDR out-of-lock condition after adaptation of the parameters for a current device and, if the CDR out-of-lock condition is detected, declares the parameters for the current device and the iteration invalid, restarts the CDR module, and moves to the next iteration, otherwise, if a CDR lock condition is detected, the adaptation module declares the parameters for the current device of the iteration valid, and continues to adaptively set parameters for a next device.

5. The apparatus of claim 4, wherein, during an iteration, the adaptation module adaptively sets the parameters of at least two of the devices in parallel before the adaptation module checks for the CDR out-of-lock condition.

6. The apparatus of claim 1, further comprising an accumulator, wherein the cycle slip detector increments and decrements contents of the accumulator based on the signal transitions between quadrants.

7. The apparatus of claim 6, wherein the cycle slip detector declares the CDR out-of-lock condition when the contents of the accumulator reaches a threshold value.

8. The apparatus of claim 1, wherein the adaptation module is coupled to a transmitter configured to provide the data stream, wherein the transmitter, based on an indication of the adaptation module, adaptively sets parameters of each device of the transmitter in a signal path of the data stream, each device comprising at least one of a gain, a filter, and an equalizer, and wherein the transmitter suspends adaptively setting the parameters when the CDR out-of-lock condition is detected by notification by the receiver to the transmitter with a predefined protocol layer.

9. The apparatus of claim 1, wherein the apparatus is embodied in a Serial DeSerializer (SerDes) device.

10. A method of operating a receiver comprising:
generating, with a clock and data recovery (CDR) module, a local clock, the CDR module comprising:
generating, with an eye monitor, a data eye from a data stream subject to equalization, the eye monitor including a transition sampler, an intermediate sampler and a data sampler, each sampler having timing derived from the local clock; and
detecting, with a cycle slip detector, a CDR out-of-lock condition based on outputs of the transition, intermediate, and data samplers with respect to signal transitions between quadrants, and adaptively setting parameters of one or more corresponding devices to the data stream based upon the local clock of the CDR module, and suspending adaptation of the parameters of at least one of the devices based on detection of the CDR out-of-lock condition.

11. The method of claim 10, wherein, for the step of adaptively setting parameters, the one or more devices include at least one of an analog front end equalizer (AFE), a decision feedback equalizer (DFE), and a gain circuit.

12. The method of claim 10, wherein suspending adaptation occurs during an acquisition period, and the method comprises obtaining an adaptation convergence over a number, N, of iterations, where N, is a positive integer.

13. The method of claim 12, comprising checking for the CDR out-of-lock condition after adaptation of the parameters for a current device and, if the CDR out-of-lock condition is detected, declaring the parameters for the current device and the iteration invalid, restarting the CDR module, and moving to the next iteration, otherwise, if a CDR lock condition is detected, declaring the parameters for the current device of the iteration valid, and continuing to adaptively set parameters for a next device.

14. The method of claim 12, wherein, during an iteration, the method comprises adaptively setting the parameters of at least two of the devices in parallel before checking for the CDR out-of-lock condition.

15. The method of claim 10, further comprising incrementing and decrementing contents of an accumulator based on the signal transitions between quadrants.

16. The method of claim 15, comprising:
comparing the contents of the accumulator to a threshold value; and
declaring the CDR out-of-lock condition when the contents of the accumulator reaches a threshold value.

17. The method of claim 10, comprising:
providing the data stream by a transmitter;
generating, by the receiver, an indication of the presence or absence of the CDR out-of-lock condition;
adaptively setting parameters of one or more devices of the transmitter in a signal path of the data stream, each device at least one of a gain, a filter, and an equalizer, and
suspending, based on the indication, the adaptively setting the parameters in the presence of the CDR out-of-lock condition.

18. The method of claim 10, wherein the method is embodied as steps executed by at least one processor of a Serial DeSerializer (SerDes) device.

19. A non-transitory machine-readable storage medium, having encoded thereon program code, wherein, when the program code is executed by a machine, the machine implements a method for adaptively setting parameters in a receiver, comprising the steps of:

generating, with a clock and data recovery (CDR) module, a local clock, the CDR module comprising:
generating, with an eye monitor, a data eye from a data stream subject to equalization, the eye monitor including a transition sampler, an intermediate sampler and a data sampler, each sampler having timing derived from the local clock; and
detecting, with a cycle slip detector, a CDR out-of-lock condition based on outputs of the transition, intermediate, and data samplers with respect to signal transitions between quadrants, and adaptively setting parameters of one or more corresponding devices to the data stream based upon the local clock of the CDR module, and suspending adaptation of the parameters of at least one of the devices based on detection of the CDR out-of-lock condition.

20. The non-transitory machine-readable storage medium of claim 19, wherein, for the step of adaptively setting parameters, the one or more devices include at least one of an analog front end equalizer (AFE), a decision feedback equalizer (DFE), and a gain circuit.

* * * * *